United States Patent
Ayyapureddi et al.

(10) Patent No.: US 12,517,825 B2
(45) Date of Patent: Jan. 6, 2026

(54) WRITE COMMAND TIMING ENHANCEMENT

(71) Applicant: Micron Technology, Inc., Boise, ID (US)

(72) Inventors: Sujeet V. Ayyapureddi, Boise, ID (US); Scott E. Smith, Plano, TX (US); Matthew A. Prather, Boise, ID (US); Erik V. Pohlmann, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 260 days.

(21) Appl. No.: 18/144,655

(22) Filed: May 8, 2023

(65) Prior Publication Data

US 2023/0367709 A1 Nov. 16, 2023

Related U.S. Application Data

(60) Provisional application No. 63/364,545, filed on May 11, 2022.

(51) Int. Cl.
*G06F 13/16* (2006.01)
*G06F 11/07* (2006.01)
*G06F 12/06* (2006.01)

(52) U.S. Cl.
CPC .......... *G06F 12/06* (2013.01); *G06F 11/0727* (2013.01); *G06F 13/1689* (2013.01); *G06F 2212/1032* (2013.01)

(58) Field of Classification Search
CPC ...................................................... G06F 12/06
USPC .................................................. 365/189.011
See application file for complete search history.

(56) References Cited

U.S. PATENT DOCUMENTS

| | | | |
|---|---|---|---|
| RE39,579 E * | 4/2007 | Hatakenaka | G11C 29/1201 714/718 |
| 2003/0202385 A1* | 10/2003 | Shin | G11C 11/4087 365/194 |
| 2006/0044900 A1* | 3/2006 | Versen | G11C 29/50 365/201 |

\* cited by examiner

*Primary Examiner* — Anthan Tran
(74) *Attorney, Agent, or Firm* — Holland & Hart LLP

(57) ABSTRACT

Methods, systems, and devices for write command timing enhancement are described. A host device may transmit (e.g., issue), to a memory device, an activation command and an associated write command according to a delay that is different (e.g., shorter) than a row access to column access delay associated with read commands. In some examples, the delay between the activation command and the associated write command may be a function of the row access to column access delay associated with read commands and one or more additional parameters, such as a timing constraint or a speed parameter of the memory device.

31 Claims, 8 Drawing Sheets

WRITE COMMAND TIMING ENHANCEMENT

CROSS REFERENCE

The present Application for Patent claims priority to U.S. Provisional Patent Application No. 63/364,545 by Ayyapureddi et al., entitled "WRITE COMMAND TIMING ENHANCEMENT," filed May 11, 2022, which is assigned to the assignee hereof, and which is expressly incorporated by reference herein.

FIELD OF TECHNOLOGY

The following relates to one or more systems for memory, including write command timing enhancement.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two stales, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
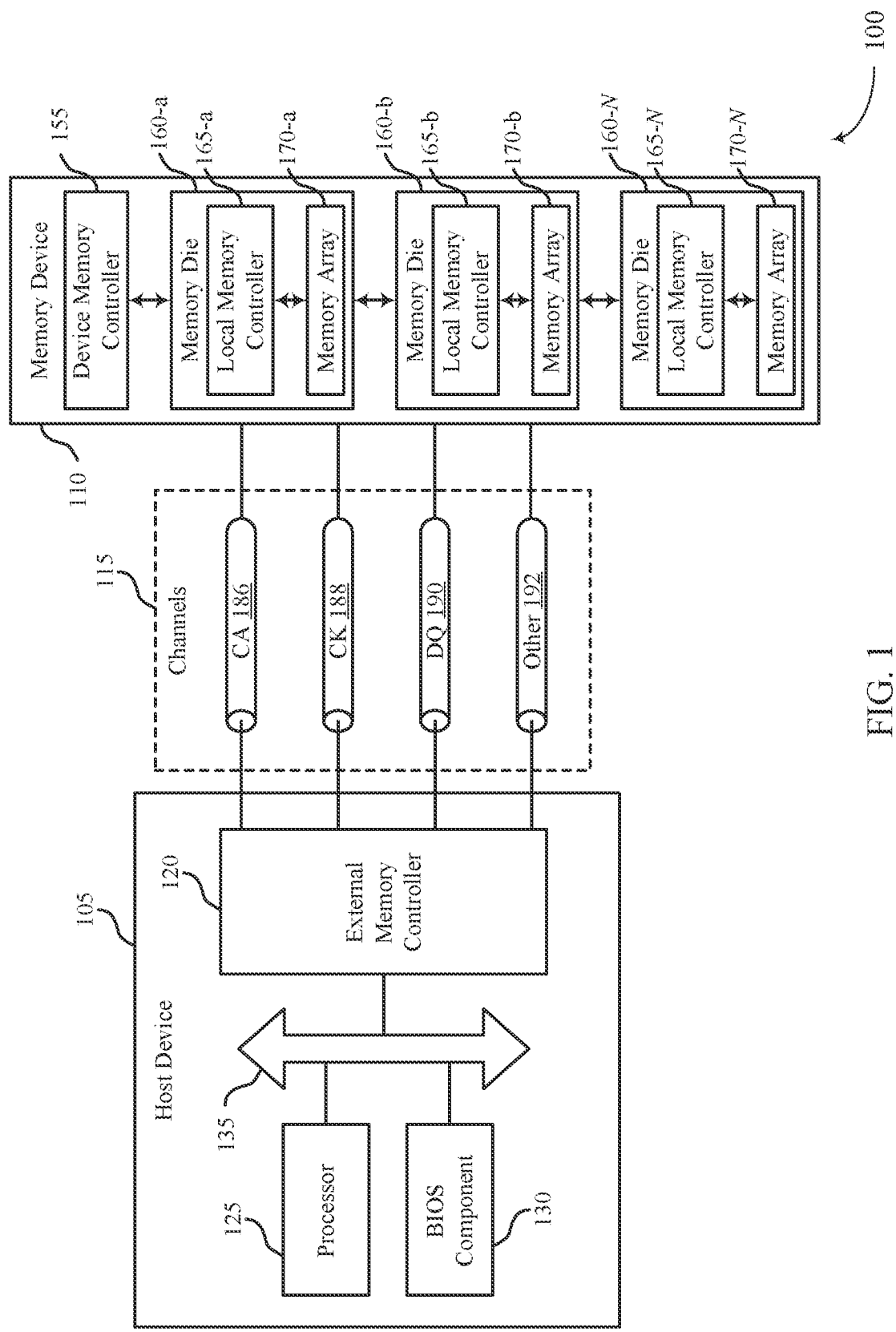
FIG. 1 illustrates an example of a system that supports write command timing enhancement in accordance with examples as disclosed herein.

To access a memory cell within a memory device (e.g., a random access memory (RAM) device), separate operations may be performed which may be triggered by separate, corresponding commands (e.g., sent by a host device or a controller such as a controller of the host device) to the memory device. For example, the memory device may receive an activation command for a set (e.g., a row) of memory cells, which may trigger an activation operation. The activation operation may activate (e.g., open) the set of memory cells within the memory device. After the activation command, the memory device may receive a data access command (e.g., a read, a write, a program, a rewrite) directed to the activated set of memory cells. Based on the data access command, the memory device may read data from or write data to one or more memory cells of the activated set.

Each of the steps of the memory access operations e.g., activating, accessing) may have an associated latency. In some cases, the memory access operations may be subject to one or more configured memory timing constraints, for example according to an industry standard specification (e.g., a JEDEC DDR5 specification). A row access to column access delay (such as tRCD) may represent a duration between an activation command and an associated data access command, which may be based on a capability of a memory device. An activation command delay, such as a row activation delay (e.g., a row-to-row activation delay (such as tRRD)) or a column activation delay (e.g., a column-to-column activation delay (such as tCCD)), may be a duration between consecutive activation commands. In some examples, such as when a host device transmits (e.g., issues) consecutive activation commands to banks of a same bank group of a memory array at the memory device, the row activation delay may be a long row activation delay (such as tRRD_L) or the column activation delay may be a long column activation delay (such as tCCD_L). A column address strobe (CAS) write latency (such as tCWL) may be a duration between receiving a write command at the memory device and an availability of input data at the memory device, which may be based on the capability of the memory device. A write recovery time (such as tWR) may be a duration between writing data at the memory device and an associated precharge command to deactivate (e.g., close) an activated set of memory cells.

In some examples, the row access to column access delay may reduce errors in a read operation. For example, the row access to column access delay may prevent a digit from flipping when a column is selected (e.g., when a column selector component activates a gate to select the column). However, in a write operation, a write driver may drive a new value to the digit as part of the write operation. It may be beneficial to reduce a duration between an activation command and a write command, for example to increase bandwidth.

In accordance with examples as described herein, a host device may transmit (e.g., issue), to a memory device, an activation command and an associated write command according to a delay that is different (e.g., shorter) than the row access to column access delay associated with read commands. In some examples, the delay between the activation command and the associated write command may be a function of the row access to column access delay associated with read commands and one or more additional parameters, such as another timing constraint. For example, the delay may be based on the function tRCD_WR=max (tCCD_L, tRCD-X), where tRCD_WR may represent the delay between the activation command and the associated write command, max(A,B) may be a function that returns the greater of values A and B, and X may represent an amount of time (e.g., a quantity of clock cycles) subtracted from tRCD based on a speed parameter (e.g., a speed grade) of the memory device.

Features of the disclosure are initially described in the context of systems and dies as described with reference to FIGS. 1 and 2. Features of the disclosure are described in the context of a memory system and a command timeline as described with reference to FIGS. 3 and 4. These and other features of the disclosure are further illustrated by and described with reference to an apparatus diagram and flowcharts that relate to write command timing enhancement as described with reference to FIGS. 5-8.

FIG. 1 illustrates an example of a system 100 that supports write command timing enhancement in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105). In some examples, the host device 105 may transmit (e.g., issue), to the memory device 110, an activation command and an associated write command according to a delay that is different (e.g., shorter) than a row access to column access delay associated with read commands. In some examples, the delay between the activation command and the associated write command may be a function of the row access to column access delay associated with read commands and one or more additional parameters, such as another timing constraint.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive information (e.g., data, commands, or both) from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory, controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

As described herein, the host device 105 may transmit (e.g., issue) commands via a CA channel 186 to access data within the memory device 110. In some examples, the host device 105 may transmit an activation command and an associated write command according to a delay that is different (e.g., shorter) than a row access to column access delay associated with read commands. In some examples, the delay between the activation command and the associated write command may be a function of the row access to column access delay associated with read commands and one or more additional parameters, such as another timing constraint.

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

Figure 2:
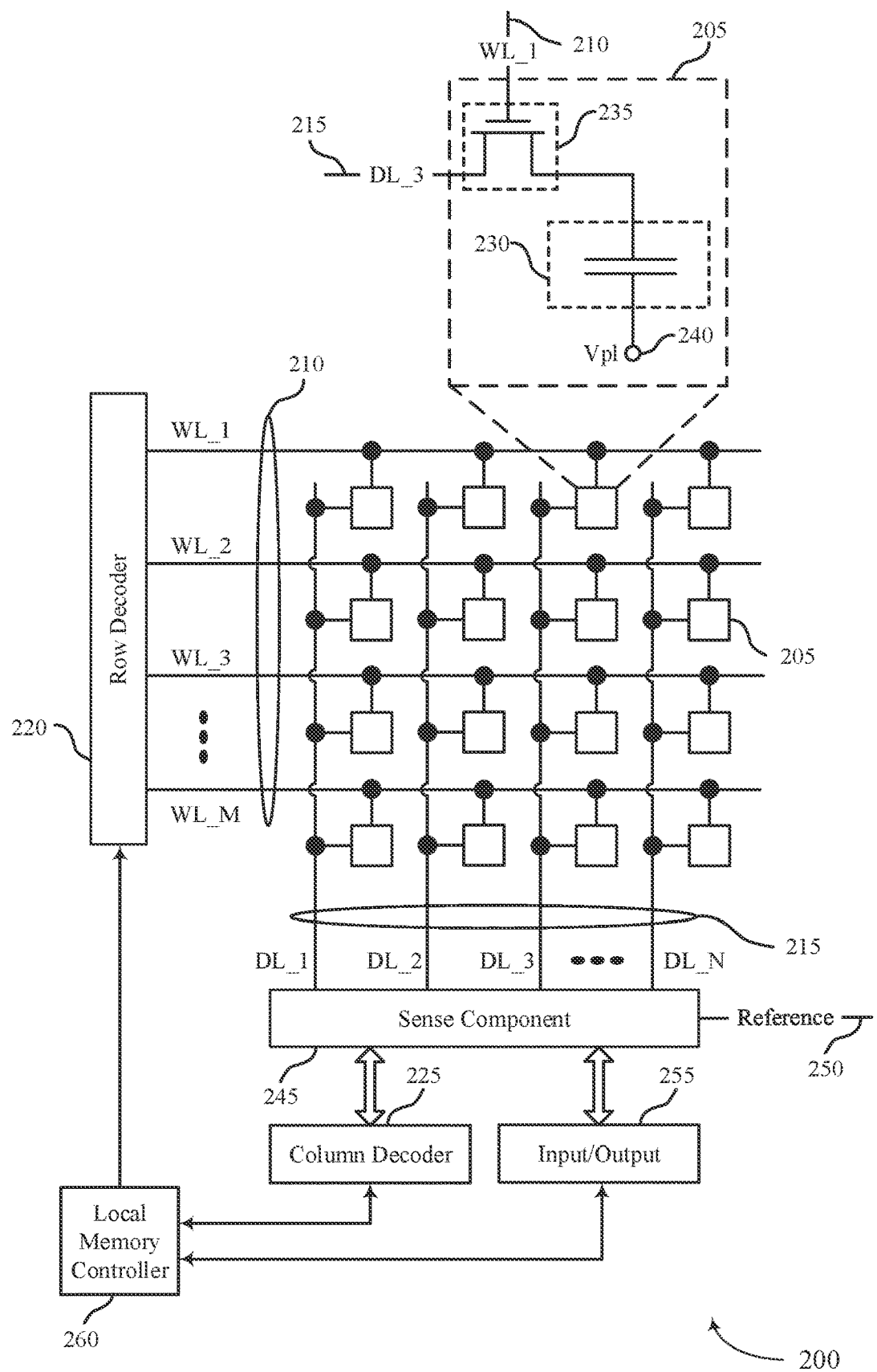
FIG. 2 illustrates an example of a memory die that supports write command timing enhancement in accordance with examples as disclosed herein.

FIG. 2 illustrates an example of a memory die 200 that supports write command timing enhancement in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210 and digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or a combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

In accordance with examples as described herein, a host device may transmit (e.g., issue), to the memory die 200, an activation command and an associated write command to access a memory cell 205. The commands may be issued according to a delay that is different (e.g., shorter) than the row access to column access delay associated with read commands. In some examples, the delay between the activation command and the associated write command may be a function of the row access to column access delay associated with read commands and one or more additional parameters, such as another timing constraint.

In some examples, the memory die 200 may perform a read-modify-write operation in response to a write command from the host device. For example, the memory die 200 may include error correcting code (ECC), for example in or coupled with the local memory controller 260. The ECC of the memory die 200 may, in some examples, trigger the memory die 200 to perform a read-modify-write operation in response to a write command. For example, based on a quantity of columns accessed for access operations according to certain data bus widths (e.g., x4) of the memory die 200, the ECC of the memory die 200 may trigger the memory die 200 to perform a read-modify-write operation in response to each write command received from the host device. Additionally, or alternatively, the host device may issue a write command with a partial bit (e.g., a WR partial bit) set to low, which may allow the memory die 200 to issue an internal read command and accordingly perform a read-modify-write operation.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

A word line 210 may be a conductive line in electronic communication with a memory cell 205 that is used to perform access operations on the memory cell 205. In some architectures, the word line 210 may be coupled with a gate of a switching component 235 of a memory cell 205 and may be operable to control the switching component 235 of the memory cell. In some architectures, the word line 210 may be coupled with a node of the capacitor of the memory cell 205 and the memory cell 205 may not include a switching component.

A digit line 215 may be a conductive line that couples the memory cell 205 with a sense component 245. In some architectures, the memory cell 205 may be selectively coupled with the digit line 215 during portions of an access operation. For example, the word line 210 and the switching component 235 of the memory cell 205 may be operable to couple or isolate the capacitor 230 of the memory cell 205 and the digit line 215. In some architectures, the memory cell 205 may be coupled with the digit line 215.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 260 may identify a target memory cell 205 on which to perform the write operation. The local memory-controller 260 may identify a target word line 210 and a target digit line 215 coupled with the target memory cell 205 (e.g., an address of the target memory cell 205). The local memory controller 260 may activate the target word line 210 and the target digit line 215 (e.g., applying a voltage to the word line 210 or digit line 215) to access the target memory cell 205. The local memory controller 260 may apply a signal (e.g., a write pulse, a write voltage) to the digit line 215 during the write operation to store a specific state (e.g., charge) in the capacitor 230 of the memory cell 205. The signal used as part of the write operation may include one or more voltage levels over a duration.

The local memory controller 260 may be operable to perform a read operation (e.g., a sense operation) on one or more memory cells 205 of the memory die 200. During a read operation, the state (e.g., logic state, charge state) stored in a memory cell 205 of the memory die 200 may be evaluated (e.g., read, determined, identified). The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal (e.g., charge, voltage) to the sense component 245 in response to biasing the access lines. The sense component 245 may amplify the signal. The local memory controller 260 may activate the sense component 245 (e.g., latch the sense component) and compare the signal received from the memory cell 205 to a reference (e.g., the reference 250). Based on that comparison, the sense component 245 may determine a logic state that is stored on the memory cell 205.

Figure 3:
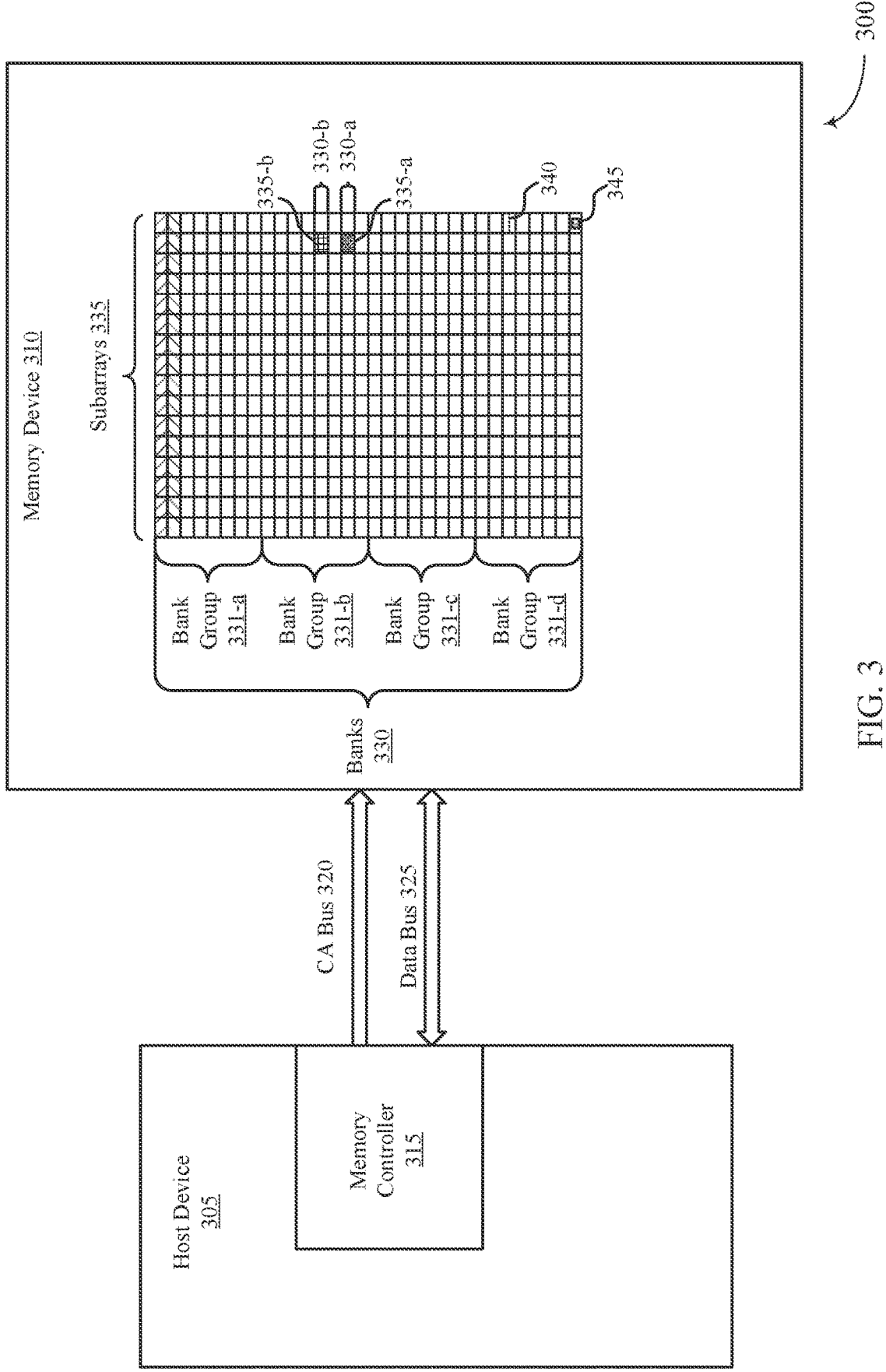
FIG. 3 illustrates an example of a memory system that supports write command timing enhancement in accordance with examples as disclosed herein.

FIG. 3 illustrates an example of a memory system 300 that supports write command timing enhancement in accordance with examples as disclosed herein. Memory system 300 may include host device 305 and memory device 310. Host device 305 may include memory controller 315 (which may be an example of an external memory controller as described with reference to FIG. 1), which may communicate with memory device 310 (which may be an example of a memory device 110 as described with reference to FIG. 1) through CA bus 320 or data bus 325. Memory device 310 may utilize DRAM, FeRAM, or other types of memory to store data at the memory device 310. The data stored in memory device 310 may be accessible by memory controller 315 and the process of accessing data stored at memory device 310 by memory controller 315 may be referred to as an access operation or a data access operation.

An access operation, such as a read or write operation, may be communicated (e.g., sent by the host device 305) to memory device 310 as a series of commands (e.g., as a command sequence). The commands may be communicated to memory device 310 by memory controller 315, for example, over CA bus 320 (which may be an example of a CA channel 186). The commands may be received by memory device 310, and may trigger corresponding operations at a memory device 310 to read, write, or otherwise access data stored by the memory device 310 (e.g., at one or more memory cells 345 of the memory device 310). The data stored at or written to the memory device 310 may be communicated between the host device 305 and the memory device 310 over data bus 325 (which may be an example of a DQ channel 190).

Memory device 310 may include multiple subarrays 335. The subarrays 335 may store data contained in memory device 310. Subarrays 335 may be grouped into banks 330, which may be grouped into bank groups 331 (e.g., a bank group 331-a, a bank group 331-b, a bank group 331-c, a bank group 331-d, or the like). In some examples, memory device 310 may contain, in some examples, thirty-two banks 330 in four bank groups 331, each of which may contain one or more subarrays 335 of memory cells 345. For instance, one or more banks 330 may contain sixteen subarrays 335. First subarray 335-a and second subarray 335-b may be examples of subarrays 335 and, as shown in this example, are located in banks 330-a and 330-b, respectively, of memory device 310. The bank 330-a and the bank 330-b may be located in a same bank group 331-b. The subarrays 335 may each contain individual rows of memory cells 345, such as row 340, that may store data associated with memory device 310 or may have data written thereto.

Accessing a row 340 may involve one or more operations, and each operation may contribute to the overall latency of accessing the row. Such operations may be based on (e.g., in response to) corresponding commands, which may be communicated by memory controller 315 to the memory device 310. The commands to access a row 340 within a subarray 335 in a bank 330 may include an activation command (e.g., corresponding to an activation operation), a data access command (e.g., corresponding to a read operation, a write operation, a program operation, a reset operation, a rewrite operation), and a precharge command (e.g., corresponding to a deactivation operation). The activation operation may open the row 340 of memory cells 345. The access operation may access the data contained in the opened (e.g., activated) row 340 (e.g., in the case of a read operation) or write data into the opened row 340 (e.g., in the case of a write operation). The precharge operation may close the opened row 340.

All three operations may be performed to access a row 340 of memory cells 345 within a subarray 335 in a bank 330 of memory device 310. In some examples, the activation operation may be performed before an access operation to open the row 340. Additionally, the precharge operation may be performed to close the activated row 340. In some cases, a precharge operation may be performed before a subsequent access operation of a row 340 in the same bank 330. The corresponding commands may be communicated from memory controller 315 to memory device 310 as a series of commands (e.g., as a command sequence). The commands may include an activation command, a data access command (e.g., a write command or a read command), and a precharge command, and may be received in the order the corresponding operations are performed.

In accordance with examples as disclosed herein, the host device 305 may transmit (e.g., issue), via the CA bus 320, an activation command and an associated write command to access a subarray 335 of the memory device 310. The commands may be issued according to a delay that is different (e.g., shorter) than the row access to column access delay associated with read commands. In some examples, the delay between the activation command and the associated write command may be a function of the row access to column access delay associated with read commands and one or more additional parameters, such as another timing constraint or a speed parameter of the memory device 310.

For example, the delay may be based on an amount of time (e.g., a quantity of clock cycles) subtracted from tRCD based on a speed parameter (e.g., a speed grade) of the memory device 310. Additionally, or alternatively, the amount of time subtracted from tRCD may be a fixed amount of time (e.g., 5 nanoseconds (ns)). In some examples, a minimum delay between the activation command and the associated write command may be based on another timing constraint (e.g., tCCD_L, tRRD_L, tCWL, or tWR).

By separating the write command delay from the delay associated with read commands, the host device 305 may improve latency and overall efficiency of system operations without violating the configured timing constraints.

Figure 4:
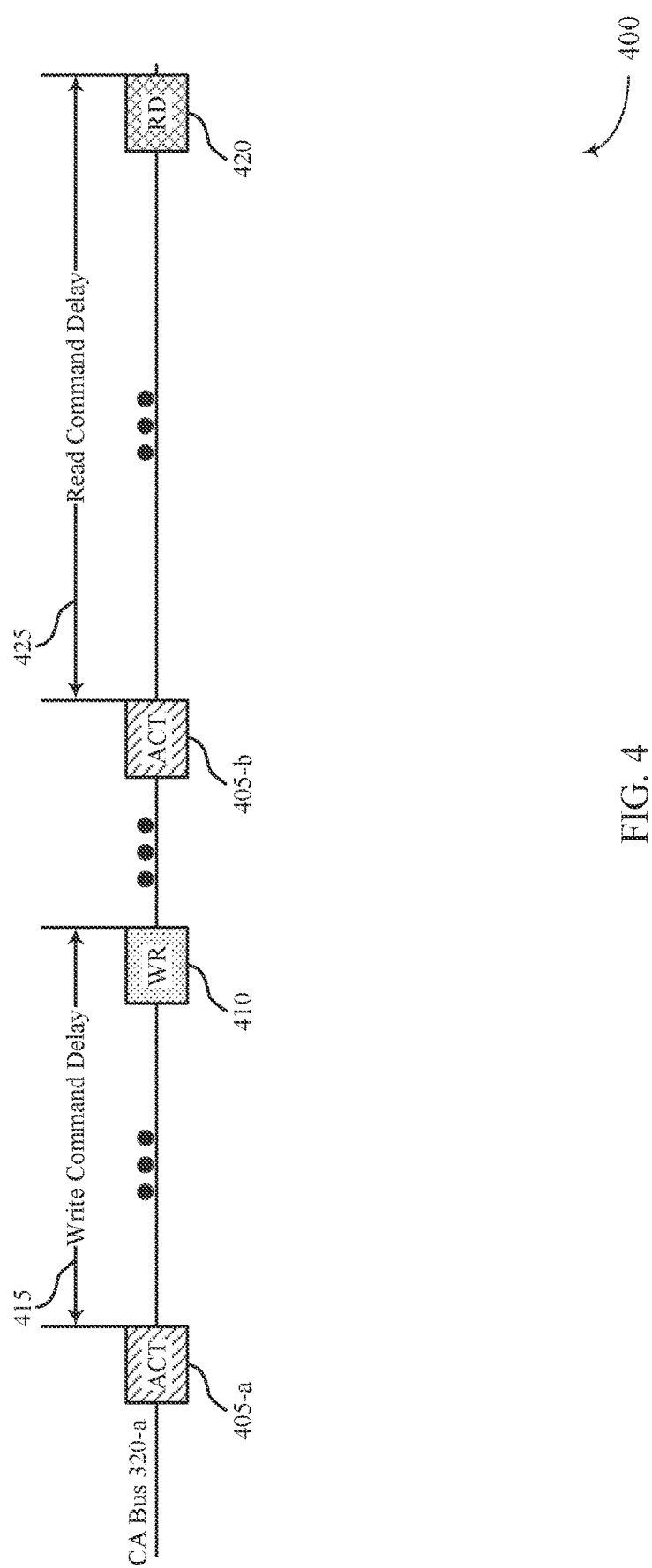
FIG. 4 illustrates an example of a command timeline that supports write command timing enhancement in accordance with examples as disclosed herein.

FIG. 4 illustrates an example of a command timeline 400 that supports write command timing enhancement in accordance with examples as disclosed herein. The command timeline 400 may include a CA bus 320-a, which may be an example of a CA bus 320 as described with reference to FIG. 3.

In accordance with examples as disclosed herein, a host device may transmit (e.g., issue) commands to a memory device via the CA bus 320-a. For example, the host device may transmit an activation command 405-a (e.g., an ACT command) and an associated write command 410 (e.g., a WR command) according to a write command delay 415 (which may be referred to as tRCD_WR in some examples). The host device may additionally transmit an activation command 405-b and an associated read command 420 (e.g., an RD command) according to a read command delay 425 (which may be referred to as tRCD or tRCD_RD in some examples). In some examples, the host device may transmit (e.g., issue) a quantity of deselect commands to the memory device during the write command delay 415 or the read command delay 425 to satisfy configured timing constraints.

In some examples, the write command delay 415 may be different (e.g., shorter) than the read command delay 425. For example, the write command delay 415 may be a function of the read command delay 425 and one or more additional parameters, such as another timing constraint or a speed parameter of the memory device. In some examples, the write command delay 415 may be based on an amount of time (e.g., a quantity of clock cycles) subtracted from the read command delay 425. The amount of time subtracted from the read command delay may be a fixed amount of time (e.g., 5 ns) or based on a timing constraint or the speed parameter (e.g., a speed grade) of the memory device. In some examples, a minimum write command delay 415 may be based on another timing constraint (e.g., tCCD_L, tRRD_L, tCWL, or tWR). For example, the write command delay 415 may be based on one of the following functions: max(tCCD_L, tRCD-X); max(0, tRCD-X); max(0, tRCD-tCWL), or max(0, tRCD-tCWL-tCCD_L).

In some examples, the memory device may perform a read-modify-write operation in response to the write command 410, for example as triggered by ECC of the memory device. For example, based on a quantity of columns accessed for access operations according to certain data bus widths (e.g., x4) of the memory die 200, the ECC may trigger the memory device to perform a read-modify-write operation in response to each write command 410 received from the host device. Additionally, or alternatively, the host device may issue a write command 410 with a partial bit (e.g., a WR partial bit) se to low, which may allow the memory device to issue an internal read command and accordingly perform a read-modify-write operation.

By separating the write command delay 415 from the read command delay 425, the host device may improve latency and overall efficiency of system operations without violating the configured timing constraints.

Figure 5:
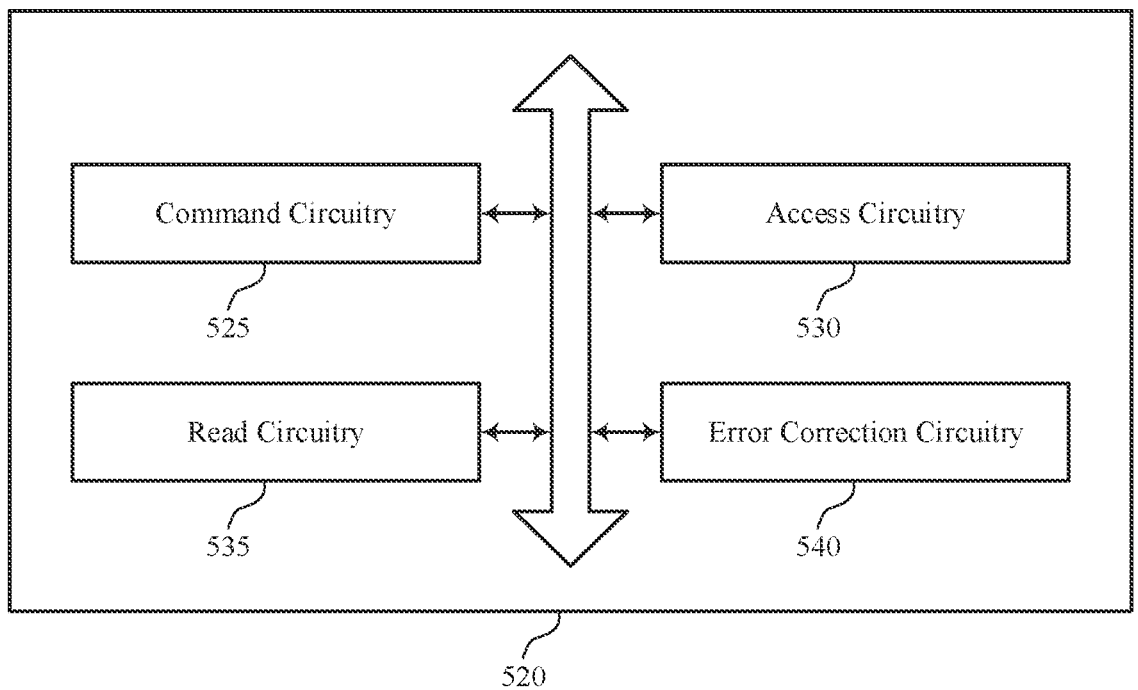
FIG. 5 shows a block diagram of a memory device that supports write command timing enhancement in accordance with examples as disclosed herein.

FIG. 5 shows a block diagram 500 of a memory device 520 that supports write command timing enhancement in accordance with examples as disclosed herein. The memory device 520 may be an example of aspects of a memory device as described with reference to FIGS. 1 through 4. The memory device 520, or various components thereof, may be an example of means for performing various aspects of write command timing enhancement as described herein. For example, the memory device 520 may include a command circuitry 525, an access circuitry 530, a read circuitry 535, an error correction circuitry 540, or any combination thereof. Each of these components may communicate, directly or indirectly, with one another (e.g., via one or more buses).

The command circuitry 525 may be configured as or otherwise support a means for receiving an activation command to open a set of memory cells of a memory device for access operations. In some examples, the command circuitry 525 may be configured as or otherwise support a means for receiving a write command an amount of time after receiving the activation command, the amount of time being less than a row address to column address delay corresponding to read commands received at the memory device, where the amount of time is based at least in part on a function of the row address to column address delay and one or more additional parameters. The access circuitry 530 may be configured as or otherwise support a means for writing a logic state in a memory cell of the set of memory cells in response to the write command.

In some examples, the one or more additional parameters include a row activation command delay, a column activation command delay, a write latency parameter, a write recovery time, a speed parameter associated with the memory device, a predetermined parameter, or any combination thereof.

In some examples, the amount of time is based at least in part on the function of the row address to column address delay and the row activation command delay. In some examples, the row activation command delay is a long row activation command delay.

In some examples, the amount of time is based at least in part on the function of the row address to column address delay and the column activation command delay. In some examples, the column activation command delay is a long column activation command delay.

In some examples, the amount of time is based at least in part on subtracting a second amount of time from the row address to column address delay, the second amount of time based at least in part on the speed parameter associated with the memory device.

In some examples, the amount of time is based at least in part on the function of the row address to column address delay and the write latency parameter. In some examples, the write latency parameter includes a column address strobe write latency.

In some examples, the command circuitry 525 may be configured as or otherwise support a means for receiving a second activation command to open a second set of memory cells of the memory device for access operations. In some examples, the command circuitry 525 may be configured as or otherwise support a means for receiving a read command a second amount of time after receiving the second activation command, the second amount of time corresponding to the row address to column address delay corresponding to read commands received at the memory device. In some examples, the access circuitry 530 may be configured as or otherwise support a means for accessing a second memory cell of the second set of memory cells in response to the read command.

In some examples, the read circuitry 535 may be configured as or otherwise support a means for reading the memory cell based at least in part on receiving the write command and determining that a quantity of memory cells to be written in response to the write command is less than a quantity of memory cells for an error detection operation. In some examples, the read circuitry 535 may be configured as or otherwise support a means for determining that a prior logic state written in the memory cell includes an error based at least in part on reading the memory cell. In some examples, the error correction circuitry 540 may be configured as or otherwise support a means for correcting the error using an error correction procedure based at least in part on determining that the logic state includes the error, where writing the logic state in the memory cell is based at least in part on correcting the error.

In some examples, to support writing the logic state in the memory cell, the access circuitry 530 may be configured as or otherwise support a means for transferring data to the memory cell via a bit line coupled with the memory cell.

In some examples, the command circuitry 525 may be configured as or otherwise support a means for receiving a precharge command to close the set of memory cells after writing the logic state in the memory cell.

In some examples, the amount of time includes a quantity of clock cycles.

In some examples, a minimum amount of time between reception of the activation command and reception of the write command is based at least in part on the one or more additional parameters. In some examples, the function of the row address to column address delay and the one or more additional parameters is based at least in part on the minimum amount of time.

Figure 6:
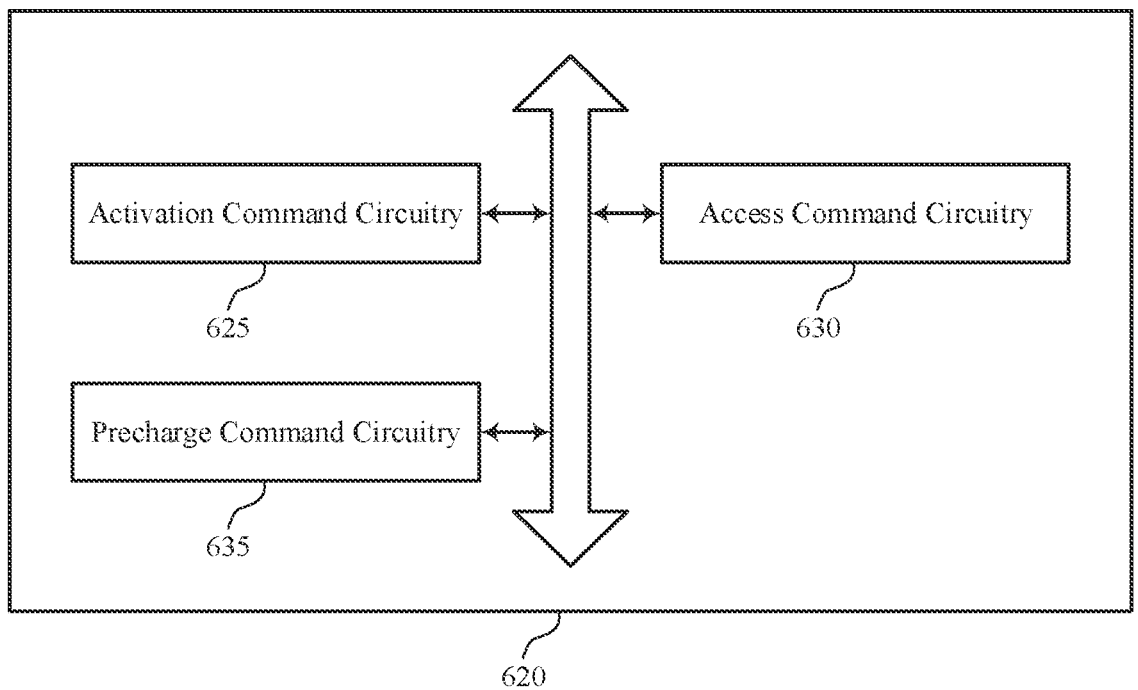
FIG. 6 shows a block diagram of a host device that supports write command timing enhancement in accordance with examples as disclosed herein.

FIG. 6 shows a block diagram 600 of a host device 620 that supports write command timing enhancement in accordance with examples as disclosed herein. The host device 620 may be an example of aspects of a host device as described with reference to FIGS. 1 through 4. The host device 620, or various components thereof, may be an example of means for performing various aspects of write command timing enhancement as described herein. For example, the host device 620 may include an activation command circuitry 625, an access command circuitry 630, a precharge command circuitry 635, or any combination thereof. Each of these components may communicate, directly or indirectly, with one another (e.g., via one or more buses).

The activation command circuitry 625 may be configured as or otherwise support a means for transmitting an activation command to open a set of memory cells of a memory device. The access command circuitry 630 may be configured as or otherwise support a means for transmitting a write command an amount of time after transmitting the activation command, the amount of time being less than a row address to column address delay corresponding to read commands received at the memory device, where the amount of time is based at least in part on a function of the row address to column address delay and one or more additional parameters. The precharge command circuitry 635 may be configured as or otherwise support a means for transmitting a precharge command to close the set of memory cells after writing a logic state in a memory cell of the set of memory cells.

In some examples, the one or more additional parameters include a row activation command delay, a column activation command delay, a write latency parameter, a write recovery time, a speed parameter associated with the memory device, a predetermined parameter, or any combination thereof.

In some examples, the amount of time is based at least in part on the function of the row address to column address delay and the row activation command delay. In some examples, the row activation command delay is a long row activation command delay.

In some examples, the amount of time is based at least in part on the function of the row address to column address delay and the column activation command delay. In some examples, the column activation command delay is a long column activation command delay.

In some examples, the amount of time is based at least in part on the function of the row address to column address delay and the write latency parameter. In some examples, the write latency parameter includes a column address strobe write latency.

In some examples, the amount of time is based at least in part on subtracting a second amount of time from the row address to column address delay, the second amount of time based at least in part on the speed parameter associated with the memory device.

In some examples, the activation command circuitry 625 may be configured as or otherwise support a means for transmitting a second activation command to open a second set of memory cells of the memory device. In some examples, the access command circuitry 630 may be configured as or otherwise support a means for transmitting a read command a second amount of time after receiving the second activation command, the second amount of time being the row address to column address delay corresponding to read commands received at the memory device.

In some examples, the write command indicates a read-modify-write operation is to be performed at the memory device.

In some examples, the amount of time includes a quantity of clock cycles.

In some examples, a minimum amount of time between transmission of the activation command and transmission of the write command is based at least in part on the one or more additional parameters. In some examples, the function of the row address to column address delay and the one or more additional parameters is based at least in part on the minimum amount of time.

Figure 7:
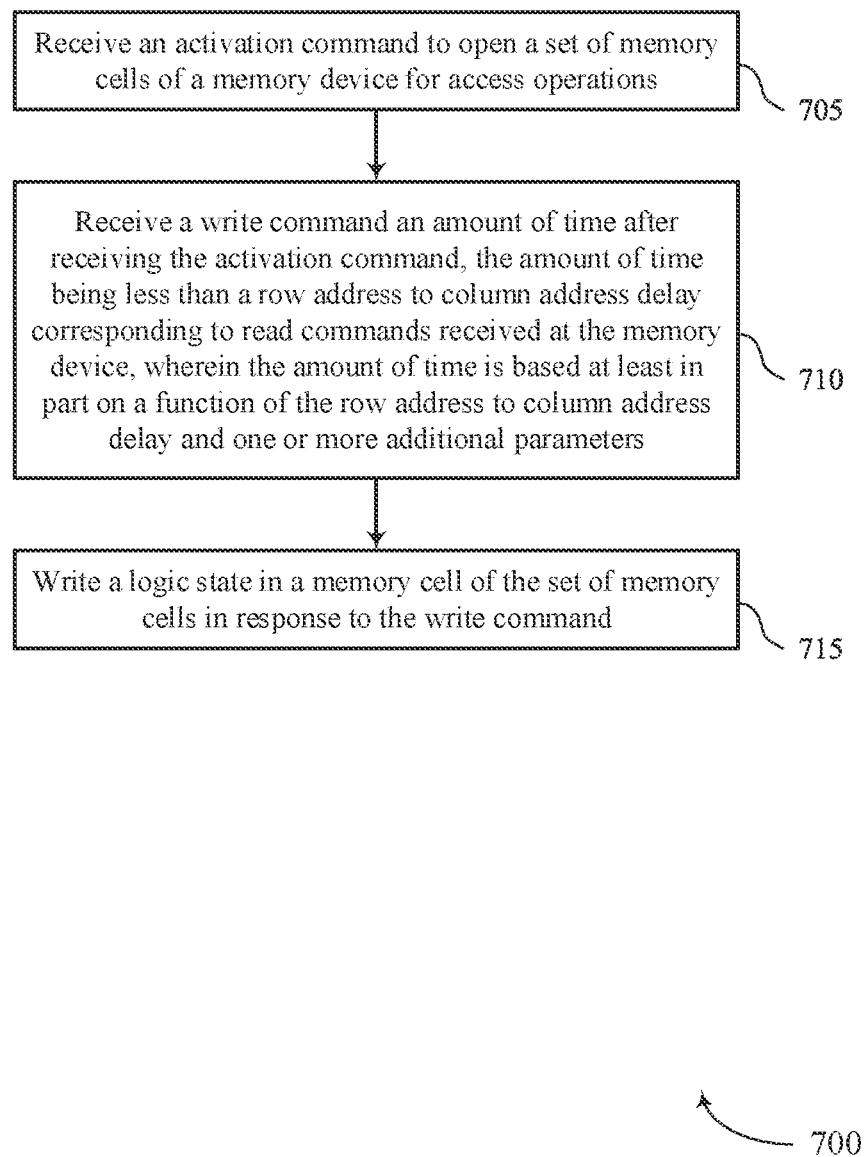
FIGS. 7 and 8 show flowcharts illustrating a method or methods that support write command timing enhancement in accordance with examples as disclosed herein.

FIG. 7 shows a flowchart illustrating a method 700 that supports write command timing enhancement in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 705, the method may include receiving an activation command to open a set of memory cells of a memory device for access operations. The operations of 705 may be performed in accordance with examples as disclosed herein. In some examples, aspects of the operations of 705 may be performed by a command circuitry 525 as described with reference to FIG. 5.

At 710, the method may include receiving a write command an amount of time after receiving the activation command, the amount of time being less than a row address to column address delay corresponding to read commands received at the memory device, where the amount of time is based at least in part on a function of the row address to column address delay and one or more additional parameters. The operations of 710 may be performed in accordance with examples as disclosed herein. In some examples, aspects of the operations of 710 may be performed by a command circuitry 525 as described with reference to FIG. 5.

At 715, the method may include writing a logic state in a memory cell of the set of memory cells in response to the write command. The operations of 715 may be performed in accordance with examples as disclosed herein. In some examples, aspects of the operations of 715 may be performed by an access circuitry 530 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving an activation command to open a set of memory cells of a memory device for access operations; receiving a write command an amount of time after receiving the activation command, the amount of time being less than a row address to column address delay corresponding to read commands received at the memory device, where the amount of time is based at least in part on a function of the row address to column address delay and one or more additional parameters; and writing a logic state in a memory cell of the set of memory cells in response to the write command.

Aspect 2: The method, apparatus, or non-transitory computer-readable medium of aspect 1 where the one or more additional parameters include a row activation command delay, a column activation command delay, a write latency parameter, a write recovery time, a speed parameter associated with the memory device, a predetermined parameter, or any combination thereof.

Aspect 3: The method, apparatus, or non-transitory computer-readable medium of aspect 2 where the amount of time is based at least in part on the function of the row address to column address delay and the row activation command delay and the row activation command delay is a long row activation command delay.

Aspect 4: The method, apparatus, or non-transitory computer-readable medium of any of aspects 2 through 3 where the amount of time is based at least in part on the function of the row address to column address delay and the column activation command delay and the column activation command delay is a long column activation command delay.

Aspect 5: The method, apparatus, or non-transitory computer-readable medium of any of aspects 2 through 4 where the amount of time is based at least in part on subtracting a second amount of time from the row address to column address delay, the second amount of time based at least in part on the speed parameter associated with the memory device.

Aspect 6: The method, apparatus, or non-transitory computer-readable medium of any of aspects 2 through 5 where the amount of time is based at least in part on the function of the row address to column address delay and the write latency parameter and the write latency parameter includes a column address strobe write latency.

Aspect 7: The method, apparatus, or non-transitory computer-readable medium of any of aspects 1 through 6, further including operations, features, circuitry, logic, means, or instructions, or any combination thereof for receiving a second activation command to open a second set of memory cells of the memory device for access operations; receiving a read command a second amount of time after receiving the second activation command, the second amount of time corresponding to the row address to column address delay corresponding to read commands received at the memory device; and accessing a second memory cell of the second set of memory cells in response to the read command.

Aspect 8: The method, apparatus, or non-transitory computer-readable medium of any of aspects 1 through 7, further including operations, features, circuitry, logic, means, or instructions, or any combination thereof for reading the memory cell based at least in part on receiving the write command and determining that a quantity of memory cells to be written in response to the write command is less than a quantity of memory cells for an error detection operation; determining that a prior logic state written in the memory cell includes an error based at least in part on reading the memory cell; and correcting the error using an error correction procedure based at least in part on determining that the logic state includes the error, where writing the logic state in the memory cell is based at least in part on correcting the error.

Aspect 9: The method, apparatus, or non-transitory computer-readable medium of any of aspects 1 through 8 where writing the logic state in the memory cell includes operations, features, circuitry, logic, means, or instructions, or any combination thereof for transferring data to the memory cell via a bit line coupled with the memory cell.

Aspect 10: The method, apparatus, or non-transitory computer-readable medium of any of aspects 1 through 9, further including operations, features, circuitry, logic, means, or instructions, or any combination thereof for receiving a precharge command to close the set of memory cells after writing the logic state in the memory cell.

Aspect 11: The method, apparatus, or non-transitory computer-readable medium of any of aspects 1 through 10 where the amount of time includes a quantity of clock cycles.

Aspect 12: The method, apparatus, or non-transitory computer-readable medium of any of aspects 1 through 11 where a minimum amount of time between reception of the activation command and reception of the write command is based at least in part on the one or more additional parameters and the function of the row address to column address delay and the one or more additional parameters is based at least in part on the minimum amount of time.

Figure 8:
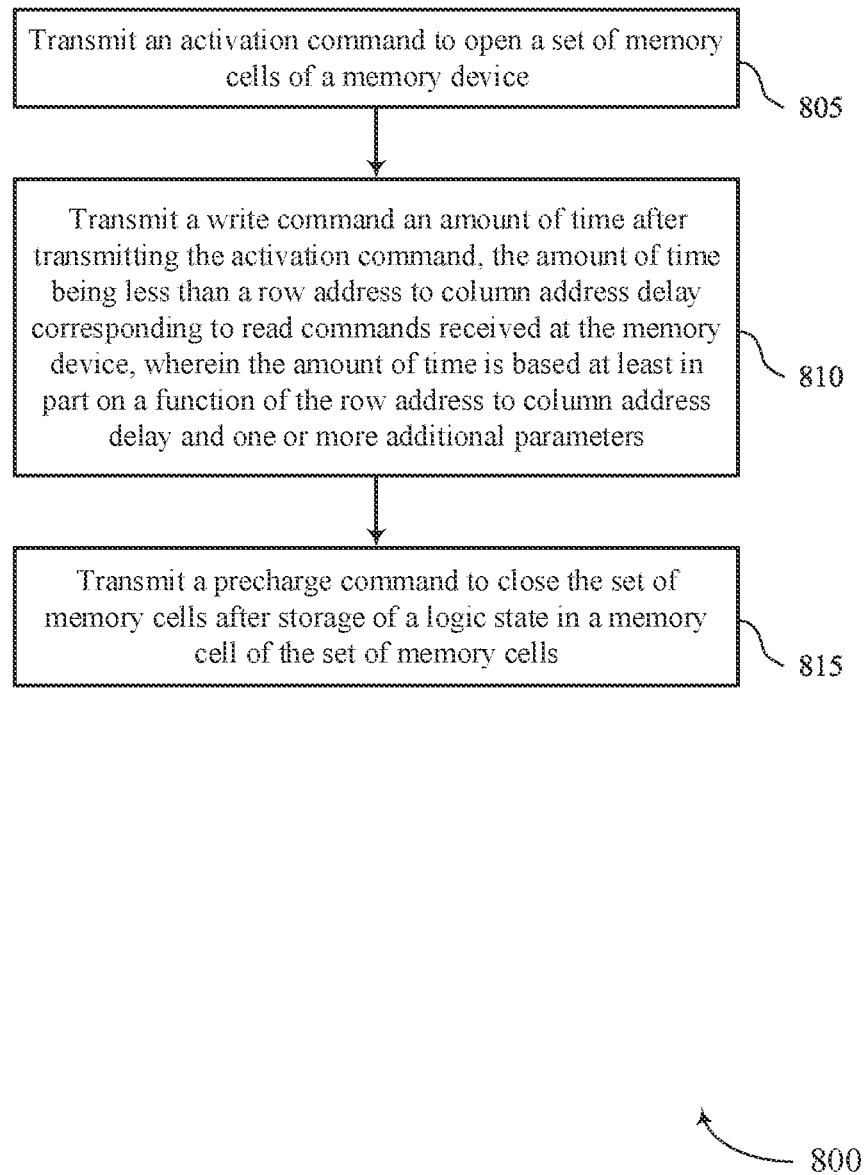

FIG. 8 shows a flowchart illustrating a method 800 that supports write command timing enhancement in accordance with examples as disclosed herein. The operations of method 800 may be implemented by a host device or its components as described herein. For example, the operations of method 800 may be performed by a host device as described with reference to FIGS. 1 through 4 and 6. In some examples, a host device may execute a set of instructions to control the functional elements of the device to perform the described functions. Additionally, or alternatively, the host device may perform aspects of the described functions using special-purpose hardware.

At 805, the method may include transmitting an activation command to open a set of memory cells of a memory device. The operations of 805 may be performed in accordance with examples as disclosed herein. In some examples, aspects of the operations of 805 may be performed by an activation command circuitry 625 as described with reference to FIG. 6.

At 810, the method may include transmitting a write command an amount of time after transmitting the activation command, the amount of time being less than a row address to column address delay corresponding to read commands received at the memory device, where the amount of time is based at least in part on a function of the row address to column address delay and one or more additional parameters. The operations of 810 may be performed in accordance with examples as disclosed herein. In some examples, aspects of the operations of 810 may be performed by an access command circuitry 630 as described with reference to FIG. 6.

At 815, the method may include transmitting a precharge command to close the set of memory cells after writing a logic state in a memory cell of the set of memory cells. The operations of 815 may be performed in accordance with examples as disclosed herein. In some examples, aspects of the operations of 815 may be performed by a precharge command circuitry 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 13: A method, apparatus, or non-transitory computer-readable medium including operations, features, circuitry, logic, means, or instructions, or any combination thereof for transmitting an activation command to open a set of memory cells of a memory device; transmitting a write command an amount of time after transmitting the activation command, the amount of time being less than a row address to column address delay corresponding to read commands received at the memory device, where the amount of time is based at least in part on a function of the row address to column address delay and one or more additional parameters; and transmitting a precharge command to close the set of memory cells after writing a logic state in a memory cell of the se of memory cells.

Aspect 14: The method, apparatus, or non-transitory computer-readable medium of aspect 13 where the one or more additional parameters include a row activation command delay, a column activation command delay, a write latency parameter, a write recovery time, a speed parameter associated with the memory device, a predetermined parameter, or any combination thereof.

Aspect 15: The method, apparatus, or non-transitory computer-readable medium of aspect 14 where the amount of time is based at least in part on the function of the row address to column address delay and the row activation command delay and the row activation command delay is a long row activation command delay.

Aspect 16: The method, apparatus, or non-transitory computer-readable medium of any of aspects 14 through 15 where the amount of time is based at least in part on the function of the row address to column address delay and the column activation command delay and the column activation command delay is a long column activation command delay.

Aspect 17: The method, apparatus, or non-transitory computer-readable medium of any of aspects 14 through 16 where the amount of time is based at least in part on the function of the row address to column address delay and the write latency parameter and the write latency parameter includes a column address strobe write latency.

Aspect 18: The method, apparatus, or non-transitory computer-readable medium of any of aspects 14 through 17 where the amount of time is based at least in part on subtracting a second amount of time from the row address to column address delay, the second amount of time based at least in part on the speed parameter associated with the memory device.

Aspect 19: The method, apparatus, or non-transitory computer-readable medium of any of aspects 13 through 18, further including operations, features, circuitry, logic, means, or instructions, or any combination thereof for transmitting a second activation command to open a second set of memory cells of the memory device and transmitting a read command a second amount of time after receiving the second activation command, the second amount of time being the row address to column address delay corresponding to read commands received at the memory device.

Aspect 20: The method; apparatus, or non-transitory computer-readable medium of any of aspects 13 through 19 where the write command indicates a read-modify-write operation is to be performed at the memory device.

Aspect 21: The method, apparatus, or non-transitory computer-readable medium of any of aspects 13 through 20 where the amount of time includes a quantity of clock cycles.

Aspect 22: The method, apparatus, or non-transitory computer-readable medium of any of aspects 13 through 21 where a minimum amount of time between transmission of the activation command and transmission of the write command is based at least in part on the one or more additional parameters and the function of the row address to column address delay and the one or more additional parameters is based at least in part on the minimum amount of time.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one o' or one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving an activation command to open a set of memory cells of a memory device for access operations;
   receiving a write command an amount of time after receiving the activation command, the amount of time being less than a row address to column address delay corresponding to read commands received at the memory device, wherein the amount of time is based at least in part on a function of the row address to column address delay and one or more additional parameters, and wherein the one or more additional parameters comprise a row activation command delay, a column activation command delay, a write recovery time, a speed parameter associated with the memory device, a predetermined parameter, or any combination thereof; and
   writing a logic state in a memory cell of the set of memory cells in response to the write command.

2. The method of claim 1, wherein:
   the amount of time is based at least in part on the function of the row address to column address delay and the row activation command delay; and
   the row activation command delay is a long row activation command delay.

3. The method of claim 1, wherein:
the amount of time is based at least in part on the function of the row address to column address delay and the column activation command delay; and
the column activation command delay is a long column activation command delay.

4. The method of claim 1, wherein the amount of time is based at least in part on subtracting a second amount of time from the row address to column address delay, the second amount of time based at least in part on the speed parameter associated with the memory device.

5. The method of claim 1, wherein:
the amount of time is based at least in part on the function of the row address to column address delay and a write latency parameter; and
the write latency parameter comprises a column address strobe write latency.

6. The method of claim 1, further comprising:
receiving a second activation command to open a second set of memory cells of the memory device for the access operations;
receiving a read command a second amount of time after receiving the second activation command, the second amount of time corresponding to the row address to column address delay corresponding to the read commands received at the memory device; and
accessing a second memory cell of the second set of memory cells in response to the read command.

7. The method of claim 1, further comprising:
reading the memory cell based at least in part on receiving the write command and determining that a quantity of memory cells to be written in response to the write command is less than a quantity of memory cells for an error detection operation;
determining that a prior logic state written in the memory cell includes an error based at least in part on reading the memory cell; and
correcting the error using an error correction procedure based at least in part on determining that the logic state includes the error, wherein writing the logic state in the memory cell is based at least in part on correcting the error.

8. The method of claim 1, wherein writing the logic state in the memory cell comprises:
transferring data to the memory cell via a bit line coupled with the memory cell.

9. The method of claim 1, further comprising:
receiving a precharge command to close the set of memory cells after writing the logic state in the memory cell.

10. The method of claim 1, wherein the amount of time comprises a quantity of clock cycles.

11. The method of claim 1, wherein:
a minimum amount of time between reception of the activation command and reception of the write command is based at least in part on the one or more additional parameters; and
the function of the row address to column address delay and the one or more additional parameters is based at least in part on the minimum amount of time.

12. A method, comprising:
transmitting an activation command to open a set of memory cells of a memory device;
transmitting a write command an amount of time after transmitting the activation command, the amount of time being less than a row address to column address delay corresponding to read commands received at the memory device, wherein the amount of time is based at least in part on a function of the row address to column address delay and one or more additional parameters, and wherein the one or more additional parameters comprise a row activation command delay, a column activation command delay, a write recovery time, a speed parameter associated with the memory device, a predetermined parameter, or any combination thereof; and
transmitting a precharge command to close the set of memory cells after writing a logic state in a memory cell of the set of memory cells.

13. The method of claim 12, wherein:
the amount of time is based at least in part on the function of the row address to column address delay and the row activation command delay; and
the row activation command delay is a long row activation command delay.

14. The method of claim 12, wherein:
the amount of time is based at least in part on the function of the row address to column address delay and the column activation command delay; and
the column activation command delay is a long column activation command delay.

15. The method of claim 12, wherein:
the amount of time is based at least in part on the function of the row address to column address delay and a write latency parameter; and
the write latency parameter comprises a column address strobe write latency.

16. The method of claim 12, wherein the amount of time is based at least in part on subtracting a second amount of time from the row address to column address delay, the second amount of time based at least in part on the speed parameter associated with the memory device.

17. The method of claim 12, further comprising:
transmitting a second activation command to open a second set of memory cells of the memory device; and
transmitting a read command a second amount of time after transmitting the second activation command, the second amount of time being the row address to column address delay corresponding to the read commands received at the memory device.

18. The method of claim 12, wherein the write command indicates a read-modify-write operation is to be performed at the memory device.

19. The method of claim 12, wherein the amount of time comprises a quantity of clock cycles.

20. The method of claim 12, wherein:
a minimum amount of time between transmission of the activation command and transmission of the write command is based at least in part on the one or more additional parameters; and
the function of the row address to column address delay and the one or more additional parameters is based at least in part on the minimum amount of time.

21. An apparatus, comprising:
a controller associated with a memory device, wherein the controller is configured to cause the apparatus to:
receive an activation command to open a set of memory cells of the memory device for access operations;
receive a write command an amount of time after receiving the activation command, the amount of time being less than a row address to column address delay corresponding to read commands received at the memory device, wherein the amount of time is based at least in part on a function of the row address to column address delay and one or more additional parameters, and wherein the one or more additional parameters comprise a row activation command delay, a column activation command delay, a write recovery time, a speed parameter associated with the memory device, a predetermined parameter, or any combination thereof; and write a logic state in a memory cell of the set of memory cells in response to the write command.

22. The apparatus of claim 21, wherein:
the amount of time is based at least in part on the function of the row address to column address delay and the row activation command delay; and
the row activation command delay is a long row activation command delay.

23. The apparatus of claim 21, wherein:
the amount of time is based at least in part on the function of the row address to column address delay and the column activation command delay; and
the column activation command delay is a long column activation command delay.

24. The apparatus of claim 21, wherein the amount of time is based at least in part on subtracting a second amount of time from the row address to column address delay, the second amount of time based at least in part on the speed parameter associated with the memory device.

25. The apparatus of claim 21, wherein:
the amount of time is based at least in part on the function of the row address to column address delay and a write latency parameter; and
the write latency parameter comprises a column address strobe write latency.

26. The apparatus of claim 21, wherein the controller is further configured to cause the apparatus to:
receive a second activation command to open a second set of memory cells of the memory device for the access operations;
receive a read command a second amount of time after receiving the second activation command, the second amount of time corresponding to the row address to column address delay corresponding to the read commands received at the memory device; and
access a second memory cell of the second set of memory cells in response to the read command.

27. The apparatus of claim 21, wherein the controller is further configured to cause the apparatus to:
read the memory cell based at least in part on receiving the write command and determining that a quantity of memory cells to be written in response to the write command is less than a quantity of memory cells for an error detection operation;
determine that a prior logic state written in the memory cell includes an error based at least in part on reading the memory cell; and
correct the error using an error correction procedure based at least in part on determining that the logic state includes the error, wherein writing the logic state in the memory cell is based at least in part on correcting the error.

28. The apparatus of claim 21, wherein, to write the logic state in the memory cell, the controller is further configured to cause the apparatus to:
transfer data to the memory cell via a bit line coupled with the memory cell.

29. The apparatus of claim 21, wherein the controller is further configured to cause the apparatus to:
receive a precharge command to close the set of memory cells after writing the logic state in the memory cell.

30. The apparatus of claim 21, wherein:
a minimum amount of time between reception of the activation command and reception of the write command is based at least in part on the one or more additional parameters; and
the function of the row address to column address delay and the one or more additional parameters is based at least in part on the minimum amount of time.

31. An apparatus, comprising:
a controller associated with a host device, wherein the controller is configured to cause the apparatus to:
transmit an activation command to open a set of memory cells of a memory device;
transmit a write command an amount of time after transmitting the activation command, the amount of time being less than a row address to column address delay corresponding to read commands received at the memory device, wherein the amount of time is based at least in part on a function of the row address to column address delay and one or more additional parameters, and wherein the one or more additional parameters comprise a row activation command delay, a column activation command delay, a write recovery time, a speed parameter associated with the memory device, a predetermined parameter, or any combination thereof; and
transmit a precharge command to close the set of memory cells after writing a logic state in a memory cell of the set of memory cells.

* * * * *